(12) United States Patent
Sato (10) Patent No.: US 6,388,901 B2
(45) Date of Patent: May 14, 2002

(54) POWER SUPPLY

(75) Inventor: Toshio Sato, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/809,565

(22) Filed: Mar. 15, 2001

(30) Foreign Application Priority Data

Mar. 15, 2000 (JP) .................................... 2000-073100

(51) Int. Cl.[7] ........................................ H02M 3/335
(52) U.S. Cl. ................................................. 363/21.01
(58) Field of Search ..................... 363/16, 20, 21.01, 363/21.07, 21.08, 21.15, 21.16, 56.01, 56.05, 95, 97, 131

(56) References Cited

U.S. PATENT DOCUMENTS

| | | | |
|---|---|---|---|
| 4,571,527 A | * | 2/1986 | Martin ..................... 315/169.4 |
| 5,161,241 A | * | 11/1992 | Kanai .......................... 363/65 |
| 5,982,641 A | * | 11/1999 | Jackson ........................ 363/21 |

FOREIGN PATENT DOCUMENTS

| | | | |
|---|---|---|---|
| JP | 4-91624 | 3/1992 | ............. H02J/1/00 |
| JP | 7-104711 | 4/1995 | ............ G09G/3/36 |

* cited by examiner

*Primary Examiner*—Matthew Nguyen
(74) *Attorney, Agent, or Firm*—Hayes Soloway P.C.

(57) ABSTRACT

In a PDP power circuit, a rectifier circuit is connected to an external commercial power source, and a high voltage power circuit is connected to the rectifier circuit and outputs a first voltage. A first capacitor is connected between an output terminal of the high voltage power circuit and the ground potential. A low voltage power circuit is also connected to the rectifier circuit and outputs a second voltage lower than the first voltage. The input terminal of a DC/DC converter is connected to the high voltage side of the first capacitor, while the output terminal of the DC/DC converter is connected to the output terminal of the low voltage power circuit. A voltage detector circuit is also connected to the output terminal of the high voltage power circuit. The first voltage is supplied to a PDP drive circuit, while the second voltage is supplied to a PDP control circuit.

20 Claims, 7 Drawing Sheets

POWER SUPPLY

BACKGROUND OF THE INVENTION

1. Field of the Invention

The present invention relates to power supply and, more particularly, to a power supply suitable for display devices.

2. Description of the Related Art

Conventionally, various types of discharge-type display devices have been developed such as plasma display panels (hereinafter referred to as PDPS). It is necessary to supply at least two types of voltages to the discharge-type display device. The two types of voltages are a drive voltage of several tens to several ten thousands of volts for turning on the display elements and a control voltage of several volts employed as the power supply voltage for a control circuit of the display elements.

In the conventional power supply which outputs such different voltages at the same time, when the power supply output is shut down, the drive voltage is first disabled and then the control voltage is disabled in sequence. This sequence is required for the following reason. If the control voltage is first disabled prior to the drive voltage at the time of shutting down the power supply output, a high voltage would be applied to control and display ICs. This would present problems of causing the ICs to be damaged or unnecessary images to appear on the display device.

Figure 1:
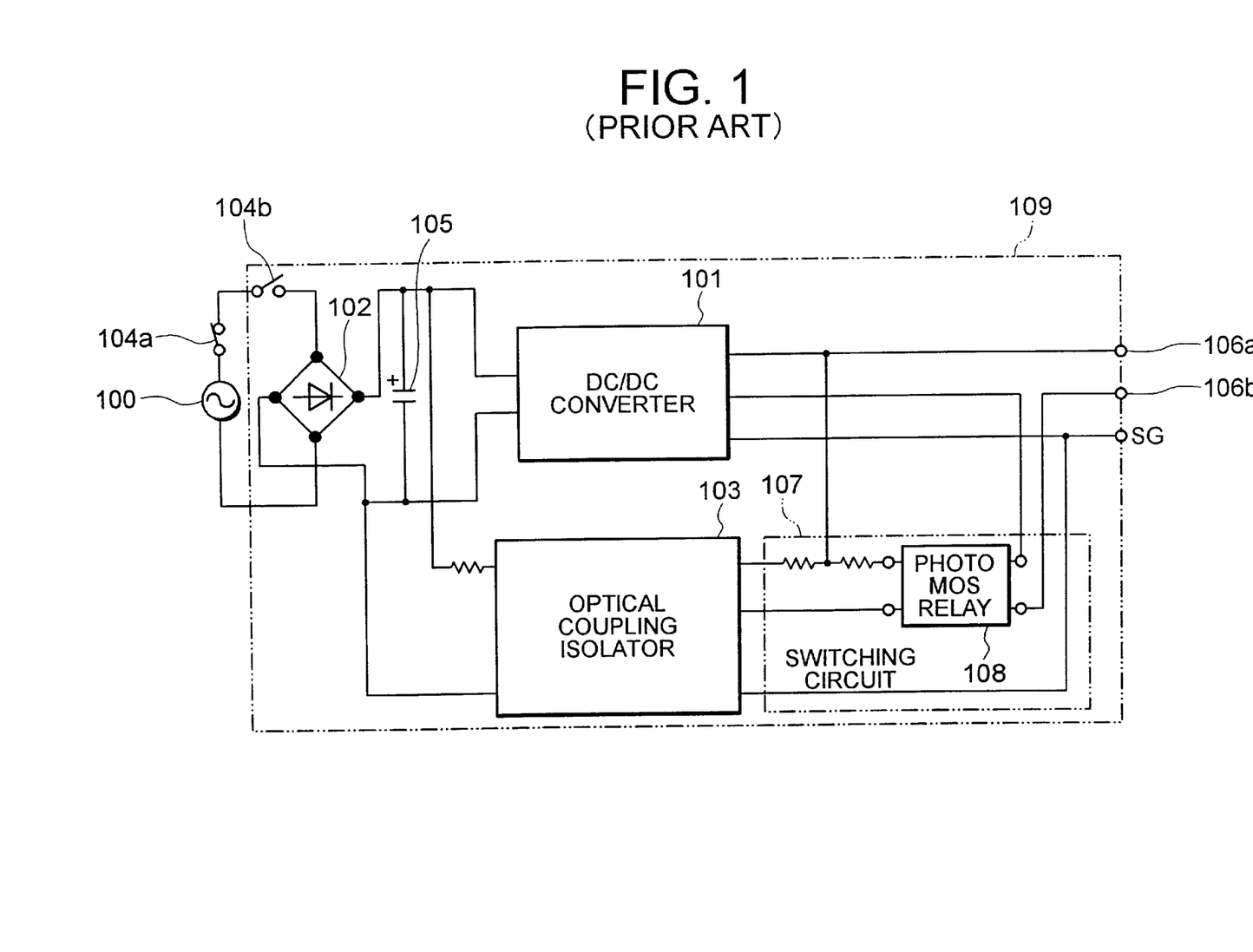
FIG. 1 is a circuit block diagram illustrating the configuration of a power supply according to a first conventional example.

In Japanese Patent Laid-Open Publication No.Hei 4-91624, disclosed is a conventional power supply which outputs such different voltages at the same time (a first conventional example). FIG. 1 is a circuit block diagram illustrating the configuration of the power supply of the first prior art. A power supply 109 shown in FIG. 1 includes a rectifier circuit 102 connected to an external commercial power source 100; switches 104a, 104b disposed between the commercial power source 100 and the rectifier circuit 102; a capacitor 105 connected to the output of the rectifier circuit 102; and a DC/DC converter 101, connected to the commercial power source 100 via the rectifier circuit 102, for generating output voltages of +5V and +35V. The power supply 109 also includes an output terminal 106a, connected to the output of the DC/DC converter 101, for providing an output voltage of +5V; an output terminal 106b, connected to the output of the DC/DC converter 101, for providing an output voltage of +35V; an optical coupling isolator 103 for outputting a signal in accordance with the input voltage of the DC/DC converter 101; and a switching circuit 107 connected to the output of the optical coupling isolator 103 and including a photo MOS relay 108 which is opened or closed in accordance with a signal outputted from the optical coupling isolator 103. The switching circuit 107 is connected between the DC/DC converter 101 and the output terminal 106b to open or close the connection between the DC/DC converter 101 and the output terminal 106b.

In the power supply of the first prior art, the optical coupling isolator 103 detects the input voltage of the DC/DC converter 101. Shutting down the power supply output from the commercial power source 100 will cause the optical coupling isolator 103 to output a signal to the photo MOS relay 108. This will cause the photo MOS relay 108 to be opened forcedly, the switching circuit 107 to be opened, and the voltage of 35V to be shut down which needs to be disabled quickly. This provides the aforementioned sequence of disabling first the drive voltage and then disabling the control voltage.

Figure 2:
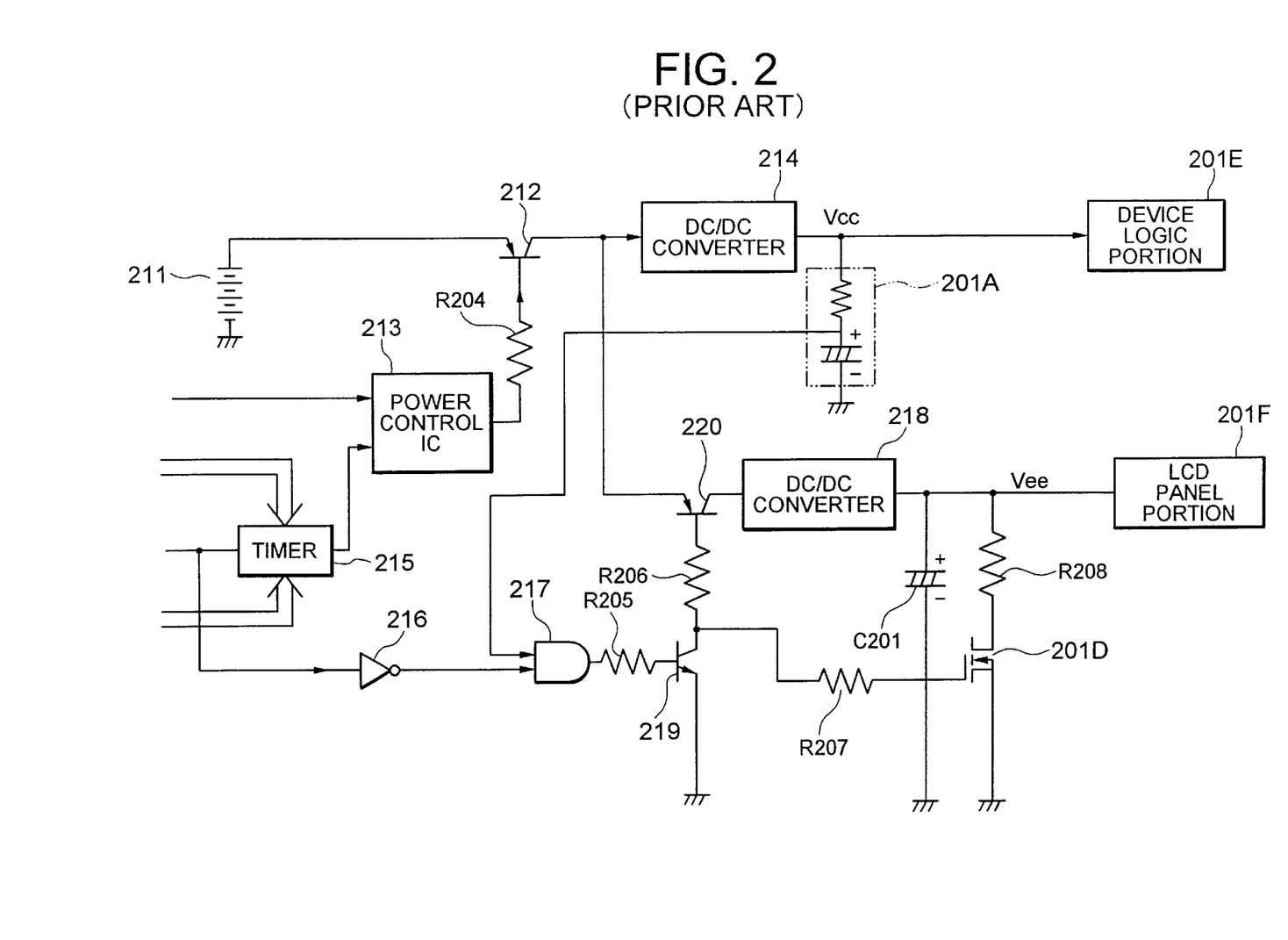
FIG. 2 is a circuit block diagram illustrating the configuration of a power circuit according to a second conventional example.

In Japanese Patent Laid-Open Publication No.Hei 7-104711, disclosed is a power supply for an LCD (Liquid Crystal Display) (second prior art). FIG. 2 is a circuit block diagram illustrating the configuration of the LCD incorporating the power supply of the second prior art. The LCD shown in FIG. 2 includes batteries 211, a DC/DC converter 214 for converting the output voltage of the batteries 211 to a control voltage Vcc, and a power switching transistor 212 connected between the batteries 211 and the DC/DC converter 214. The LCD also includes a power control IC 213 connected to the base of the power switching transistor 212 via a resistor R204; a timer 215 connected to the power control IC 213; an inverter 216 connected to the timer 215; and an AND gate 217, the input of which is connected to the inverter 216 and a delay device 201A and the output of which is connected to the base of an LCD power front-stage transistor 219 via a resistor R205. The LCD also includes an LCD power rear-stage transistor 220, the collector of which is connected to the power switching transistor 212 and the base of which is connected to the collector of the LCD power front-stage transistor 219 via a resistor R206; a device logic portion 201E to which the control voltage Vcc is supplied from the DC/DC converter 214: and a DC/DC converter 218 for converting the output voltage of the batteries 211 to a drive voltage Vee. The LCD further includes an LCD panel portion 201F to which the drive voltage Vee is supplied from the DC/DC converter 218; a delay device 201A which is connected between the output terminal of the DC/DC converter 214 and the ground and which includes a resistor and a capacitor; and an FET 201D driven by the delay device 201A. The device logic portion 201E is the control circuit of the LCD panel portion 201F. In addition, the LCD has a capacitor C201 connected to the DC/DC converter 218. Furthermore, the LCD is provided with a resistor R208 connected to the higher potential side of the FET 201D in series therewith. Still furthermore, a resistor R207 is connected between the collector of the LCD power front-stage transistor 219 and the FET 201D.

In the power supply of the second prior art, when the power from the batteries 211 is shut down, the delay device 201A causes the FET 201D to conduct. This allows the drive voltage Vee to be disabled forcedly prior to the control voltage Vcc, thereby providing the aforementioned sequencing.

However, each of the aforementioned techniques present the problems described below. The power supply of the first prior art has a problem of requiring the employment of the optical coupling isolator 103 and the photo MOS relay 108, thereby leading to an increase in cost of the power supply.

On the other hand, the power supply of the second prior art is a power circuit for an LCD display device and therefore supplies a drive voltage of several tens of volts. In contrast, a drive voltage of several hundreds to several ten thousands of volts is required for discharge-type display devices such as CRTs (Cathode Ray Tubes) or PDPs. In the power supply of the second prior art, such high voltages would be produced to cause the following problems.

Figure 3:
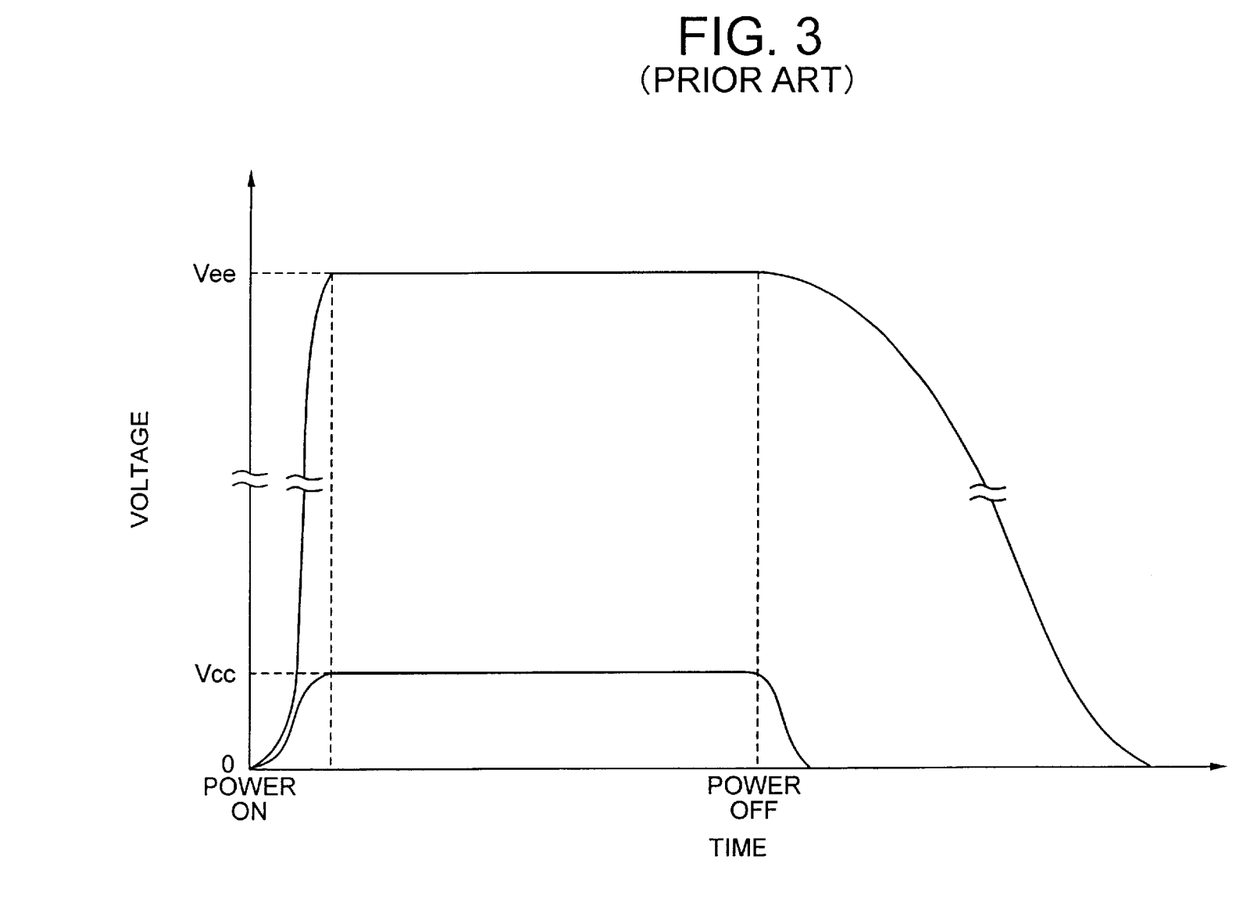
FIG. 3 is a graph illustrating the time dependency of the output voltage of the power circuit according to the second conventional example.

FIG. 3 is a graph illustrating the time dependency of the output voltage of the power supply of the second prior art. As shown in FIG. 3, the drive voltage Vee and the control voltage Vcc increase together after the power output has been turned on and decrease together after the power has been turned off. At this time, the power supply of the second prior art allows the control voltage Vcc to be disabled in a short period of time. On the contrary, as shown in FIG. 2, the power supply has the capacitor C201 of a large-capacity connected to the output terminal of the DC/DC converter 218. This will not allow the power accumulated in the capacitor C201 to be discharged quickly, causing the drive voltage Vee to be sustained at a high voltage for a long period of time. This causes the device logic portion 201E to stop the operation thereof first, whereas a high voltage is kept being applied to the LCD panel portion 201F. This causes the drive voltage Vee of a high voltage to be applied to the drive circuit of the inactivated LCD panel portion 201F and to control circuits such as the gate circuit of the control IC of the device logic portion 201E. When a high voltage is generated in the power supply of the second prior art to drive a discharge-type display device, the drive voltage Vee as high as several hundreds to several ten thousands of volts would be applied to the drive and control circuits of the display device to cause damage to these circuits in some cases.

Furthermore, a discharge circuit would be required to discharge the power accumulated in the capacitor C201 when the power supply output is shut down. A discharge current of high voltage and high current would pass through the resistor R208 and the FET 201D of the second prior art, which constitute the discharge circuit. This makes it necessary to provide an extremely high allowable voltage for these components. This causes a problem of significantly increasing the cost for manufacturing the power supply.

SUMMARY OF THE INVENTION

It is an object of the present invention to provide a power supply which has a simple configuration and which is fabricated at a low cost without components of a high allowable voltage. It is another object of the present invention to provide a power supply which can provide an extended period of time for the voltage output from the low voltage power circuit and thereby ensure the power shutdown sequence of disabling the drive voltage prior to the control voltage, whereby the drive and control circuits of the display device can be prevented from being damaged by the application of the drive voltage.

A power supply according to the present invention comprises a first power circuit, supplied with a voltage from an external power source, for outputting a first voltage; a first capacitor for being charged with said first voltage; and a second power circuit, supplied with a voltage from said external power source, for outputting a second voltage lower than said first voltage. The power supply also comprises a voltage converter circuit, an input terminal thereof being connected to a high voltage side of said first capacitor, and an output terminal thereof being connected to an output terminal of said second power circuit, wherein power accumulated in said first capacitor is converted to a voltage to be supplied to the output terminal of said second power circuit when said external power source stops supplying the voltage.

In the power supply according to the present invention, the power accumulated in the first capacitor is discharged to the output of the second power circuit via the voltage converter circuit after the power supply output has been shut down. Upon shutting down the power supply output, this allows the first voltage to be disabled quickly in a short period of time and sustain the second voltage for a fixed period of time. This makes it possible to disable the drive voltage prior to the control voltage in a discharge-type display device incorporating the power supply according to the present invention when the first voltage is employed as the drive voltage for driving the display device and the second voltage is employed as the control voltage for controlling the display device. This prevents a high drive voltage from being applied to the control and drive circuits of the display device. This makes it possible to prevent damage to the control and drive circuits of the display device.

Furthermore, it is not necessary to provide components such as an optical coupling isolator or photo MOS relay for the power supply according to the present invention. Furthermore, the voltage converter circuit converts the power accumulated in the first capacitor to the second voltage for supply, thereby obviating the need of a discharge circuit of a large capacity which is essential to the conventional power supply. This makes it possible to provide the power supply at a reduced cost.

Another power supply according to the present invention comprises a first power circuit, supplied with a voltage from an external power source, for outputting a first voltage; a first capacitor for being charged with said first voltage; and a second power circuit, supplied with a voltage from said external power source, for outputting a second voltage lower than said first voltage. The power supply according to the present invention also comprises a voltage converter circuit, an input terminal thereof being connected to a high voltage side of said first capacitor, and an output terminal thereof being connected to an input terminal of said second power circuit, wherein power accumulated in said first capacitor is converted to a voltage to be supplied to the input terminal of said second power circuit when said external power source stops supplying the voltage.

After the power supply output has been shut down, the present invention allows the power accumulated in the first capacitor to be discharged to the input of the second power circuit via the voltage converter circuit, thereby making it possible to further stabilize the second voltage.

DETAILED DESCRIPTION OF THE PREFERRED EMBODIMENTS

Now, power supplies according to the embodiments of the present invention will be explained specifically below with reference to the accompanying drawings. First, a first embodiment of the present invention will be explained.

Figure 4:
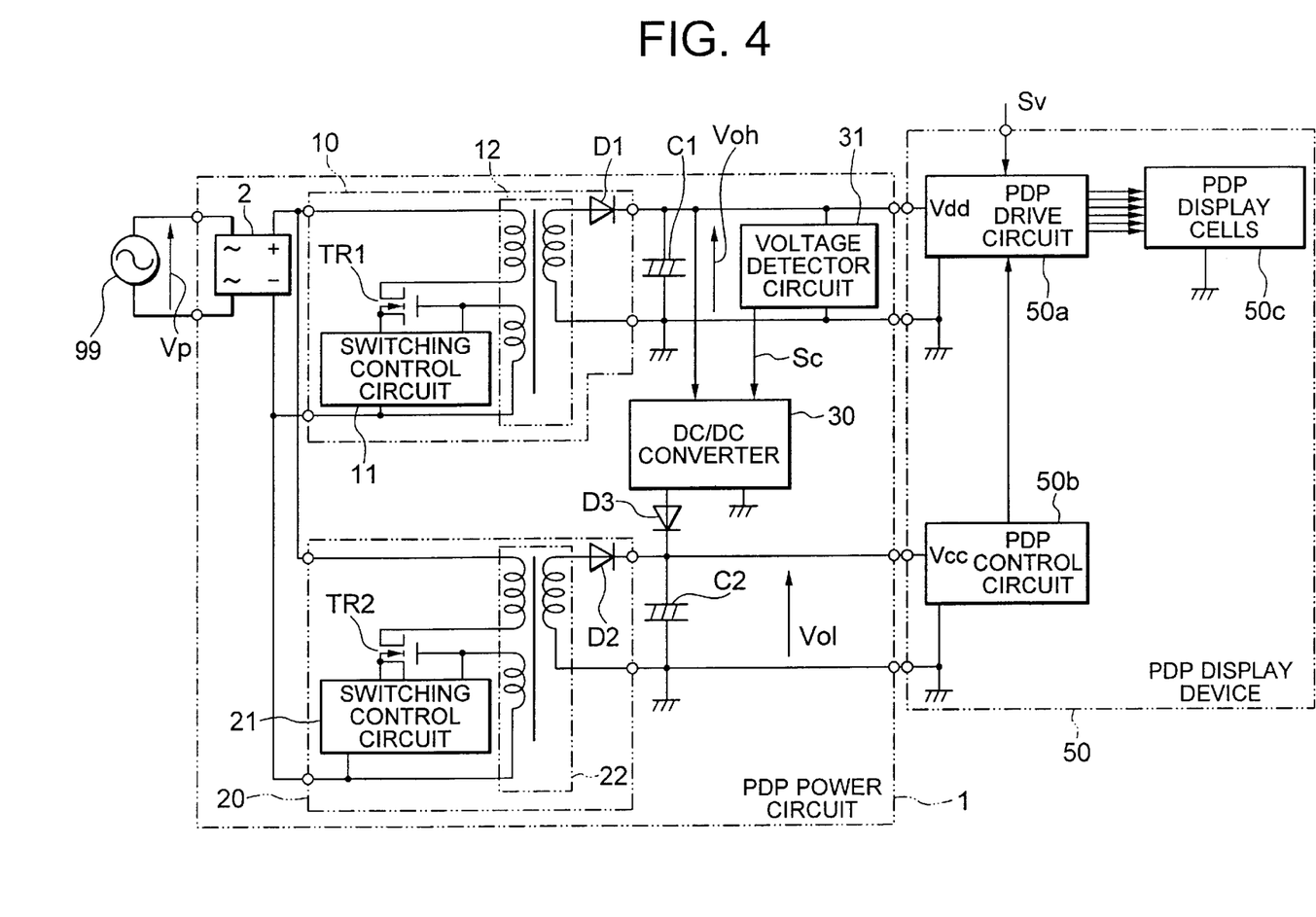
FIG. 4 is a circuit block diagram illustrating the configuration of a power supply according to a first embodiment of the present invention and a display device incorporating the power supply.

FIG. 4 is a circuit block diagram illustrating the configuration of a power supply according to the first embodiment of the present invention and a display device incorporating the power supply. A PDP (Plasma Display Panel) power circuit 1 (power supply) shown in FIG. 4 is connected between a commercial power source 99 and a PDP display device 50 and converts an AC power supply voltage Vp supplied from the commercial power source 99 to a DC drive voltage Vdd and a DC control voltage Vcc, which are in turn supplied to the PDP display device 50.

The PDP display device 50 includes a PDP drive circuit 50a for converting an image signal Sv supplied externally to a drive signal for driving PDP display cells 50c; a PDP control circuit 50b for controlling the operation of the PDP drive circuit 50a; and the PDP display cells 50c used for display in accordance with the drive signal supplied from the PDP drive circuit 50a.

The PDP power circuit 1 includes a rectifier circuit 2 connected to the commercial power source 99; a high voltage power circuit 10, connected to the rectifier circuit 2, for outputting a voltage Voh; a capacitor C1 connected between an output terminal of the high voltage power circuit 10 and the ground potential; and a low voltage power circuit 20, connected to the rectifier circuit 2, for outputting a voltage Vol which is lower than the voltage Voh. The PDP power circuit 1 also includes a capacitor C2 connected between an output terminal of the low voltage power circuit 20 and the ground potential; a DC/DC converter 30 connected to the capacitor C1; a voltage detector circuit 31, connected between an output terminal of the high voltage power circuit 10 and the ground potential, for outputting an operation control signal Sc to the DC/DC converter 30; and a diode D3 connected between the DC/DC converter 30 and the capacitor C2.

The rectifier circuit 2 includes a diode bridge or the like. The rectifier circuit 2 converts the AC power supply voltage Vp supplied from the commercial power source 99 to a DC voltage.

The high voltage power circuit 10 includes a switching control circuit 11, a switching transformer 12, a switching transistor TR1, and a diode D1. The high voltage power circuit 10 is a switching power circuit for converting the power supply voltage Vp rectified by the rectifier circuit 2 to the voltage Voh for output. Under a steady state, the output voltage Voh acts as the drive voltage Vdd to be applied to the PDP drive circuit 50a. In this embodiment, the drive voltage Vdd is set at 170V.

The capacitor C1 is connected between the output terminal of the high voltage power circuit 10 and the ground potential and becomes charged by the output voltage Voh of the high voltage power circuit 10.

The low voltage power circuit 20 includes a switching control circuit 21, a switching transformer 22, a switching transistor TR2, and a diode D2. The low voltage power circuit 20 is a switching power circuit for converting the power supply voltage Vp rectified by the rectifier circuit 2 to the voltage Vol for output. Under a steady state, the output voltage Vol acts as the control voltage Vcc to be applied to the PDP control circuit 50b. In this embodiment, the control voltage Vcc is set at 5V.

The capacitor C2 is connected between an output terminal of the low voltage power circuit 20 and the ground potential. The capacitor C2 is preferably adapted to have a large capacity of several thousands $\mu$F to provide an extended output period of time of the control voltage Vcc.

The DC/DC converter 30 is connected between the output terminal of the high voltage power circuit 10 and the ground potential and converts the voltage Voh of the high voltage power circuit 10 to the voltage Vol, then supplying the voltage Vol to the capacitor C2 via the diode D3. The DC/DC converter 30 can employ an arbitrary circuit scheme such as an isolating type DC/DC converter.

The diode D3 is connected between the output terminal of the DC/DC converter 30 and the output terminal of the low voltage power circuit 20 to be forward biased in the direction from the DC/DC converter 30 to the low voltage power circuit 20, preventing back-flow of current from the output terminal of the low voltage power circuit 20 to the output terminal of the DC/DC converter 30.

The voltage detector circuit 31 is connected between the output terminal of the high voltage power circuit 10 and the ground potential. The voltage detector circuit 31 detects the output voltage Voh of the high voltage power circuit 10 to compare the voltage Voh with a voltage set point Vs which has been set in advance therein. For example, the voltage set point Vs is 160V at the drive voltage Vdd of 170V. The voltage detector circuit 31 initiates outputting the operation control signal Sc when the voltage Voh of the high voltage power circuit 10 has dropped from a rating voltage of the drive voltage Vdd (170V) to the voltage set point Vs (160V). On the other hand, the voltage detector circuit 31 stops outputting the operation control signal Sc when the output voltage Voh of the high voltage power circuit 10 has dropped to the minimum operation voltage Vlow of the DC/DC converter 30. The voltage detector circuit 31 can employ various types of known voltage comparison circuits such as one utilizing a voltage comparator circuit or the like.

Figure 5:
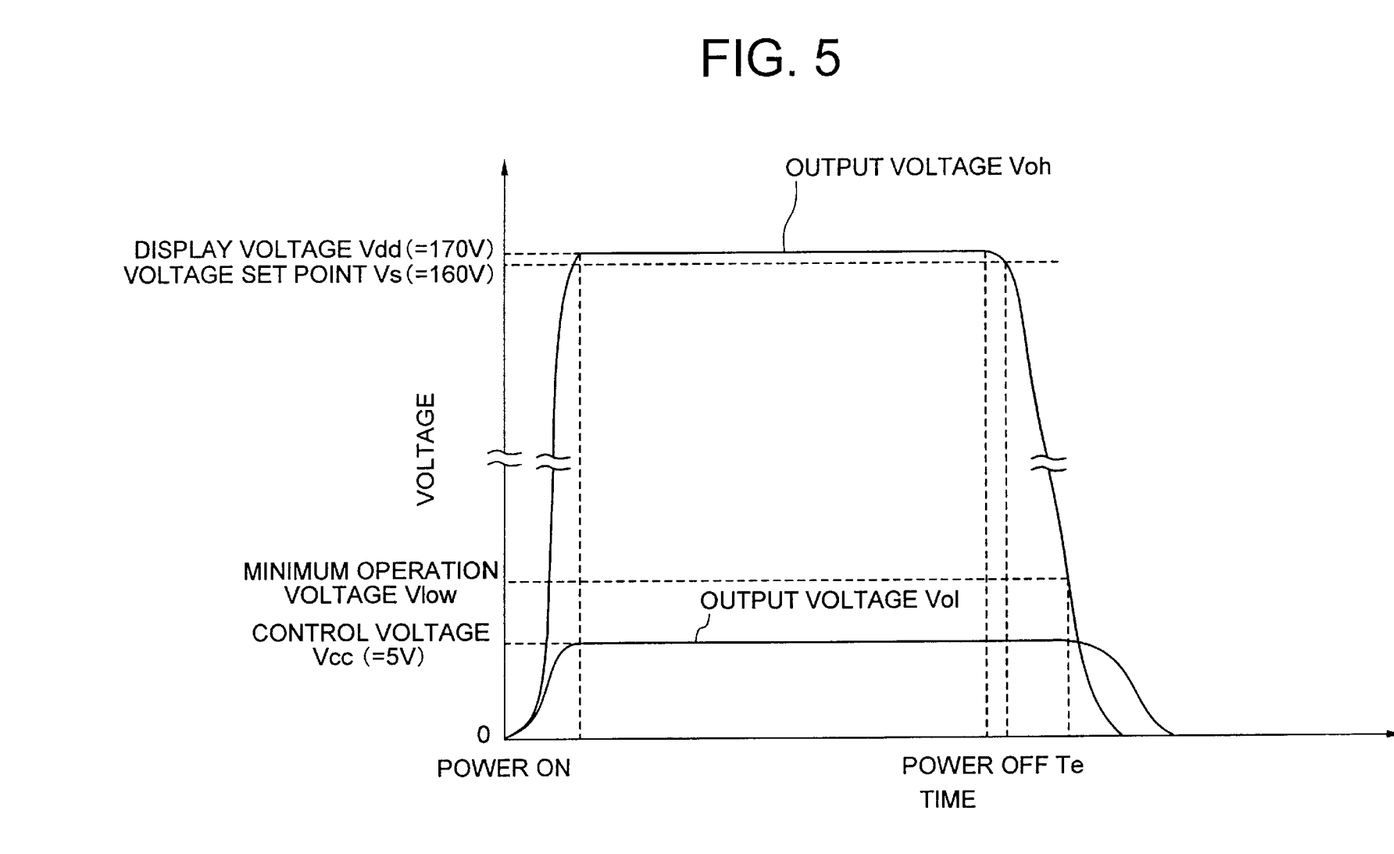
FIG. 5 is a graph illustrating the time dependency of the output voltage of the power circuit according to the first embodiment of the present invention.

Now, the operation of the PDP power circuit 1 of this embodiment will be described below. FIG. 5 is a graph illustrating the time dependency of the output voltage of the power circuit according to this embodiment.

Referring to FIG. 4, when the commercial power source 99 initiates supplying the power supply voltage Vp to the PDP power circuit 1 (the power supply output is enabled), as shown in FIG. 5, the output voltage Voh of the high voltage power circuit 10 and the output voltage Vol of the low voltage power circuit 20 increase rapidly together, allowing the output voltage Voh to become equal to the drive voltage Vdd (170V) and the output voltage Vol to become equal to the control voltage Vcc (5V).

Then, when the commercial power source 99 stops supplying the power supply voltage Vp (the power supply output is disabled), the power accumulated in the capacitor C1 is gradually discharged, causing the output voltage Voh to drop gradually.

When the output voltage Voh has dropped to the voltage set point Vs (160V), the voltage detector circuit 31 outputs the operation control signal Sc to activate the DC/DC converter 30.

The DC/DC converter 30, activated as such, converts the output voltage Voh to the control voltage Vcc (5V) employing the power accumulated in the capacitor C1 and then supplies the control voltage Vcc to the capacitor C2 as an output voltage Vol via the diode D3.

The initiation of the operation of the DC/DC converter 30 causes the power accumulated in the capacitor C1 to decrease rapidly, thus causing the output voltage Voh to drop rapidly. However, the output of the control voltage Vcc can be sustained up to time Te at which the output voltage Voh becomes to the minimum operation voltage Vlow of the DC/DC converter 30.

As described above, upon shutting down of the power supply output, this embodiment makes it possible to convert the power accumulated in the capacitor C1 to the control voltage Vcc for discharge. This makes it possible to implement the sequence of disabling quickly the drive voltage Vdd of the display device prior to the control voltage Vcc. This also makes it possible to provide an extended period of time for the output of the control voltage Vcc even after the power supply output has been shut down.

Figure 6:
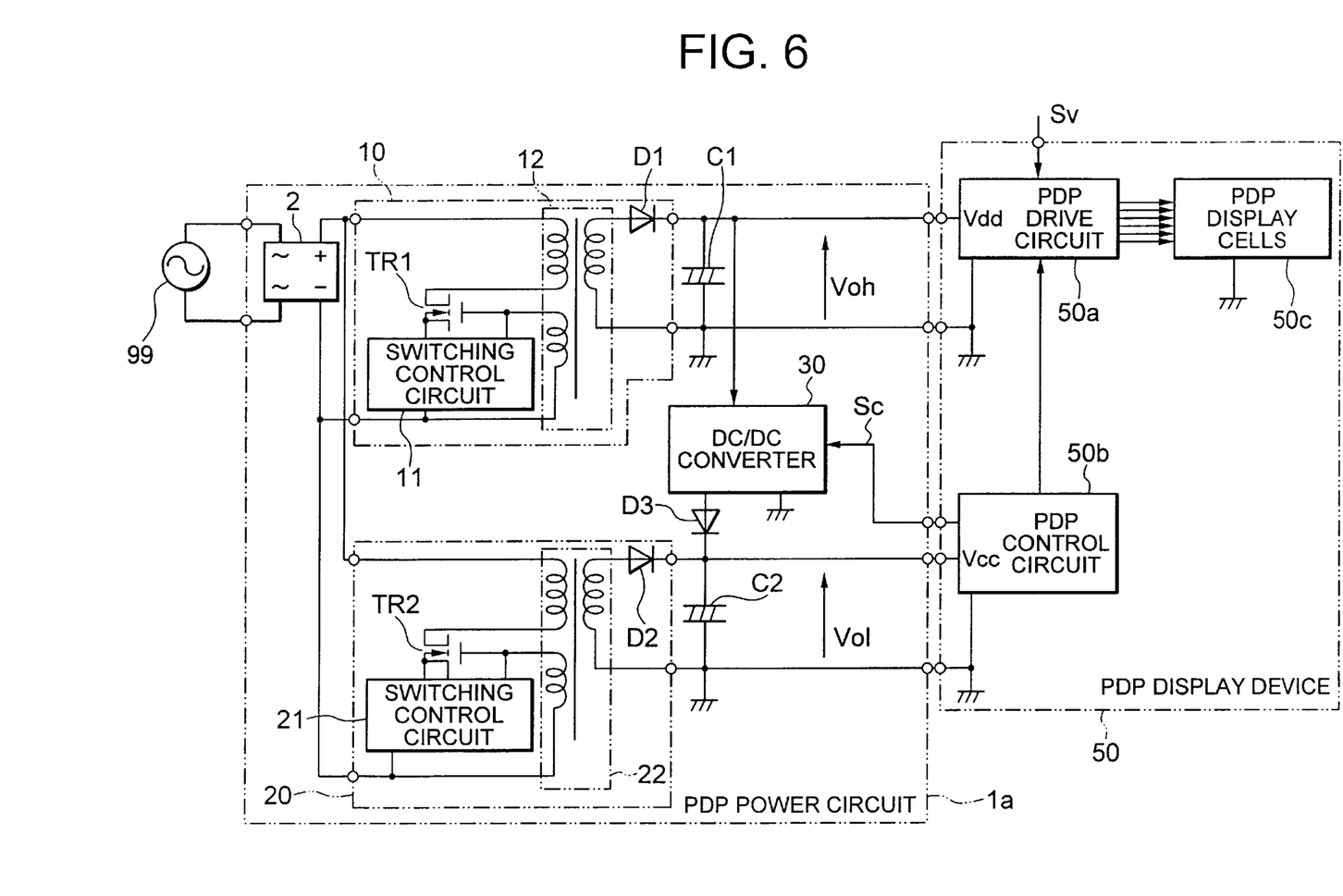
FIG. 6 is a circuit block diagram illustrating the configuration of a power supply according to a second embodiment of the present invention and a display device incorporating the power supply.

FIG. 6 is a circuit block diagram illustrating the configuration of a power supply according to a second embodiment of the present invention and a display device incorporating the power supply. A PDP power circuit 1a shown in FIG. 6 excludes the voltage detector circuit 31 from the PDP power circuit 1 shown in FIG. 4 and has the PDP control circuit 50b connected to the DC/DC converter 30 to allow the PDP control circuit 50b to control the output of the operation control signal Sc. The components of the PDP power circuit 1a according to this embodiment other than those mentioned above remain the same as those of the PDP power circuit 1 shown in FIG. 4.

When the output voltage Voh has dropped below the voltage set point Vs, the PDP power circuit 1a according to this embodiment allows the PDP control circuit 50b to output the operation control signal Sc to the DC/DC converter 30 to activate the DC/DC converter 30. On the other hand, the PDP control circuit 50b stops outputting the operation control signal Sc when the output voltage Voh of the high voltage power circuit 10 has dropped to the minimum operation voltage Vlow of the DC/DC converter 30. The operations of the PDP power circuit 1a according to this embodiment other than that mentioned above are the same as those of the PDP power circuit 1 shown in FIG. 4.

The aforementioned PDP power circuit 1 according to the first embodiment is provided with the voltage detector circuit 31 to detect the output voltage Voh of the high voltage power circuit 10 in order to control the DC/DC converter 30. In contrast to this, the PDP power circuit 1a according to this embodiment allows the PDP control circuit 50b to output the operation control signal Sc in order to control the activation and suspension of the DC/DC converter 30. This makes it possible to allow the PDP control circuit 50b to control the operation of the PDP power circuit 1 and the PDP display device 50. In this embodiment, this configuration makes it possible to implement the control of power supply output using the control circuit or the like of the PDP display device without the voltage detector circuit 31 (see FIG. 4).

Figure 7:
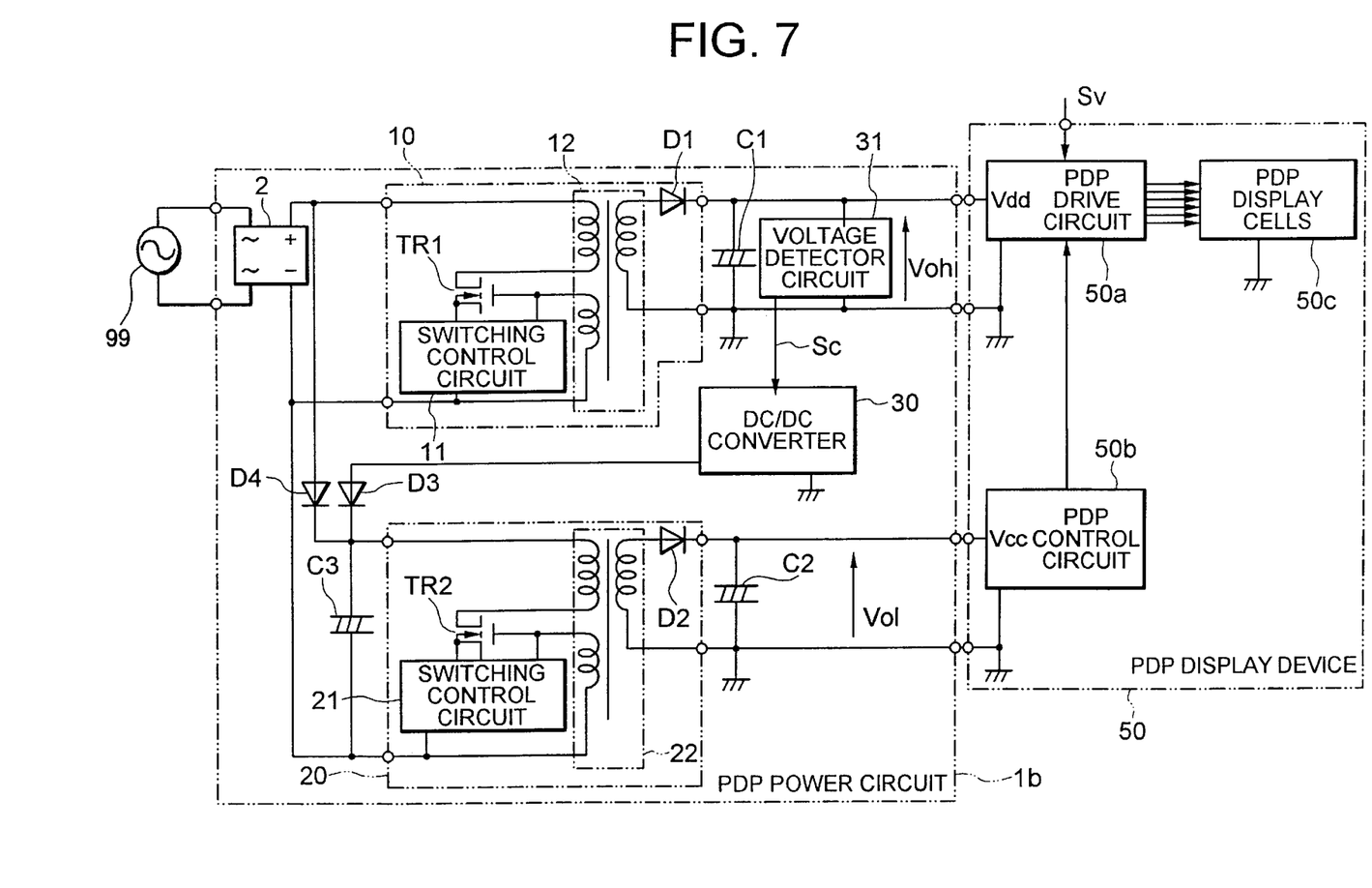
FIG. 7 is a circuit block diagram illustrating the configuration of a power supply according to a third embodiment of the present invention and a display device incorporating the power supply.

FIG. 7 is a circuit block diagram illustrating the configuration of a power supply according to a third embodiment of the present invention and a display device incorporating the power supply. As shown in FIG. 7, in a PDP power circuit 1b according to this embodiment, a capacitor C3 is connected an input terminal of the low voltage power circuit 20. The capacitor C3 is charged with an input voltage of the low voltage power circuit 20. A diode D3 is also connected between the DC/DC converter 30 and the capacitor C3 so as to be forward biased in the direction from the DC/DC converter 30 to the capacitor C3. A diode D4 for preventing back-flow is also connected in the direction from the input of the high voltage power circuit 10 to the input of the low voltage power circuit 20. The components of the PDP power circuit 1b according to this embodiment other than those mentioned above are the same as those of the PDP power circuit 1 according to the aforementioned first embodiment.

As shown in FIG. 4, in the aforementioned first embodiment, the output of the DC/DC converter 30 is supplied via the diode D3 to the capacitor C2 connected to the output of the low voltage power circuit 20. In contrast to this, as shown in FIG. 7, this embodiment allows the output of the DC/DC converter 30 to be supplied via the diode D3 to the capacitor C3 connected to the input of the low voltage power circuit 20. The operations of the PDP power circuit 1b according to this embodiment other than those mentioned above are the same as those of the PDP power circuit 1 according to the aforementioned first embodiment.

This makes it possible to stabilize the output voltage Vol of the low voltage power circuit 20 at the time of shutting down the power supply output. Furthermore, since the diode D4 is provided, the back-flow of the output of the DC/DC converter 30 to the input of the high voltage power circuit 10 is prevented.

Incidentally, in each of the aforementioned embodiments, such examples have been shown that employ the switching power circuits as the high voltage power circuit 10 and the low voltage power circuit 20. However, the high and low voltage power circuits of the present invention are not limited to a switching power circuit and can employ a power circuit of an arbitrary scheme. Furthermore, in each of the aforementioned embodiments, the diodes D3 and D4 are employed as the elements for preventing back-flow. However, the present invention may employ an arbitrary element other than diodes, which has a function of preventing back-flow, as an element for preventing back-flow.

Furthermore, in each of the aforementioned embodiments, the DC/DC converter 30 is employed as the circuit for converting voltages. However, other voltage converter circuits of an arbitrary scheme may be employed as long as the circuits have no deleterious effects on the operation of the high voltage power circuit 10 and the low voltage power circuit 20.

Still furthermore, in the aforementioned second embodiment, the PDP control circuit 50b is adapted to control the output of the operation control signal Sc. However, processing means such as a microcomputer or CPU may be built in the PDP power circuit 1 itself to allow the processing means to detect the voltage inputted to the PDP drive circuit 50a, thereby controlling the output of the operation control signal Sc.

What is claimed is:

1. A power supply comprising:
 a first power circuit, supplied with a voltage from an external power source, for outputting a first voltage,
 a first capacitor for being charged with said first voltage,
 a second power circuit, supplied with a voltage from said external power source, for outputting a second voltage lower than said first voltage, and
 a voltage converter circuit, an input terminal thereof being connected to a high voltage side of said first capacitor, an output terminal thereof being connected to an output terminal of said second power circuit, and said voltage converter circuit converting power accumulated in said first capacitor to a voltage to be supplied to the output terminal of said second power circuit when said external power source stops supplying the voltage.

2. The power supply according to claim 1, wherein said first capacitor is connected between an output terminal of said first power circuit and a reference voltage lower than said first and second voltages.

3. The power supply according to claim 1, further comprising a first diode connected between the output terminal of said voltage converter circuit and the output terminal of said second power circuit.

4. The power supply according to claim 1, further comprising a second capacitor for being charged with said second voltage.

5. A power supply comprising:

a first power circuit, supplied with a voltage from an external power source, for outputting a first voltage, a first capacitor for being charged with said first voltage, a second power circuit, supplied with a voltage from said external power source, for outputting a second voltage lower than said first voltage, and a voltage converter circuit, an input terminal thereof being connected to a high voltage side of said first capacitor, an output terminal thereof being connected to an input terminal of said second power circuit, and said voltage converter circuit converting power accumulated in said first capacitor to a voltage to be supplied to the input terminal of said second power circuit when said external power source stops supplying the voltage.

6. The power supply according to claim 5, wherein said first capacitor is connected between an output terminal of said first power circuit and a reference voltage lower than said first and second voltages.

7. The power supply according to claim 5, further comprising a second capacitor for being charged with said second voltage.

8. The power supply according to claim 5, further comprising a third capacitor for being charged with an input voltage of said second power circuit.

9. The power supply according to claim 5, further comprising a second diode connected between the output terminal of said voltage converter circuit and the input terminal of said second power circuit.

10. The power supply according to claim 1, further comprising a rectifier circuit connected to the input terminal of said first power circuit and the input terminal of said second power circuit.

11. The power supply according to claim 1, wherein said first voltage and said second voltage are supplied to a display device.

12. The power supply according to claim 11, wherein said display device is a discharge-type display device.

13. The power supply according to claim 12, wherein said display device is a plasma display panel.

14. The power supply according to claim 11, wherein said first voltage is a drive voltage, being supplied to said display device to drive said display device.

15. The power supply according to claim 11, wherein said second voltage is a control voltage, being supplied to said display device to control said display device.

16. The power supply according to claim 1, wherein said voltage converter circuit is a DC/DC converter.

17. The power supply according to claim 1, wherein said voltage converter circuit is activated when said first voltage has dropped from a rating voltage to a pre-set voltage.

18. The power supply according to claim 1, wherein said voltage converter circuit is activated when an operation control signal has been inputted.

19. The power supply according to claim 18, further comprising a voltage detector circuit, connected to the output terminal of said first power circuit, for outputting said operation control signal to said voltage converter circuit when said first voltage has dropped from a rating voltage to a pre-set voltage.

20. The power supply according to claim 18, wherein said display device has a control circuit for outputting an operation control signal to said voltage converter circuit when said first voltage has dropped from a rating voltage to a pre-set voltage.

* * * * *